H. S. DAVIS.
ANIMAL TRAP.
No. 180,558. Patented Aug. 1, 1876.
Fig: 1.
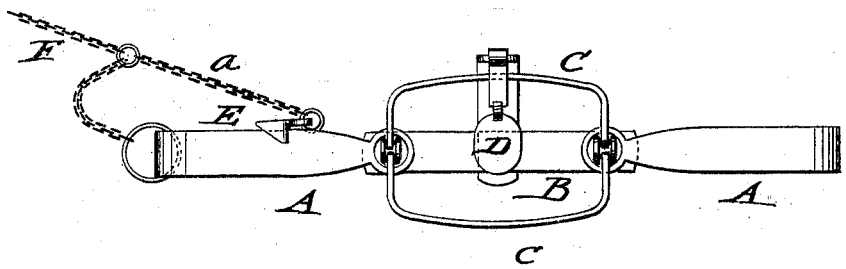
Fig: 2.
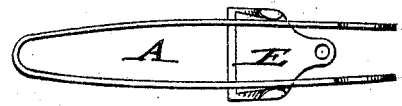

UNITED STATES PATENT OFFICE.

HOMER S. DAVIS, OF CAMP BROWN, WYOMING TERRITORY.

IMPROVEMENT IN ANIMAL-TRAPS.

Specification forming part of Letters Patent No. 180,558, dated August 1, 1876; application filed July 1, 1876.

*To all whom it may concern:*

Be it known that I, HOMER S. DAVIS, of Camp Brown, in the county of Sweetwater and Territory of Wyoming, have invented a new and Improved Animal-Trap, of which the following is a specification:

In the accompanying drawing, Figure 1 represents a top view of my improved trap, and Fig. 2 a side view of the spring and clamping attachment.

Similar letters of reference indicate corresponding parts.

The object of my invention is to improve the well-known spring-trap used for catching animals of large size, such as beavers, foxes, otter, &c., so as to prevent the throwing out of the leg or foot, or the breaking of the same by the action of the spring, in consequence of which the animals frequently escape.

The invention consists in providing a trap having jaws, double spring, and trigger with a clamp for preventing the action of one of the springs, the same being attached to the trap-chain by a short connecting-chain.

In the drawing, A A are the band-springs of an animal-trap of the well-known construction employed to catch the larger kinds of animals, as beavers, foxes, &c. The springs A act on the jaws C, that swing on eyes of a base-piece, B, and are set by a trigger mechanism, D. The trigger device of the trap is arranged below the level of the jaws, when the same are spread open, so as to prevent the closing of the trap by floating débris or ice when placed in water, or prematurely by the body of the animal. When the trigger is set deeper these objections do not occur, while the reliable and certain action of the trap is increased. A clamp-piece, E, is connected by a short chain, *a*, with the trap-chain, so as to be applied to either one of the springs A. The trap is set with the clamped spring in the direction from which the animal is expected to approach, so that it will readily pass over the same onto the bait-pan, and be caught by the jaws without being thrown out by the simultaneous action of the clamped spring. This forms a common source of escape, as the animal frequently stands over the spring, and is, by the release of the same, thrown out of the trap or caught only at the toe, so that it may succeed in getting off.

By the action of one spring only at a time, the breaking of the leg or toe is prevented, and the animal is held until, by pulling at the chain, the clamp is released, and thereby the second spring brought to bear on the trap-jaws, so that the animal is firmly held without chance of escape. The clamp should always be set on the side of the spring next to the trigger, with the eye toward the eye of the spring, so that it will come off easily by the pulling of the chain, but not work off by the stepping of the animal upon the same.

The clamp-connecting chain is applied at such length to the trap-chain that it will act on the clamp before the trap-chain gets tightly stretched. In this manner the reliable and more perfect working of the trap is secured by means of simple and effective attachment.

Having thus described my invention, I claim as new and desire to secure by Letters Patent—

In combination with an animal-trap made of double springs, jaws, and trigger, a clamp-piece attached by a connecting-chain to the trap-chain, all constructed and arranged to operate substantially in the manner and for the purpose set forth.

HOMER SPENCER DAVIS.

Witnesses:
WILLIAM JONES,
GEO. N. WROE.